No. 664,396. Patented Dec. 25, 1900.
I. FISHER.
DYNAMO ELECTRIC MACHINE.
(Application filed Apr. 3, 1899.)
(No Model.)
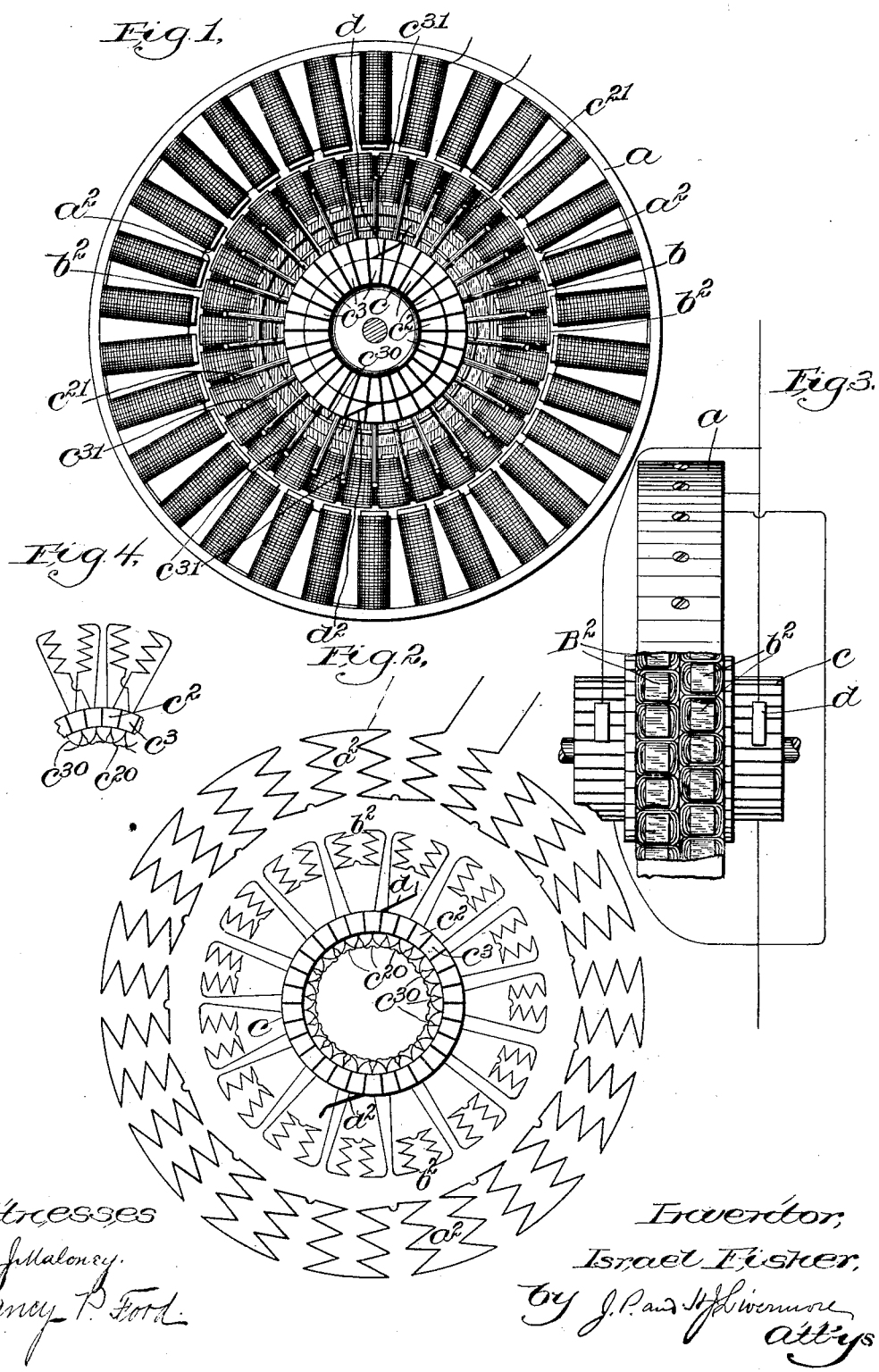

UNITED STATES PATENT OFFICE.

ISRAEL FISHER, OF BOSTON, MASSACHUSETTS, ASSIGNOR TO REUEL W. WATERS, OF NEWTON, MASSACHUSETTS.

DYNAMO-ELECTRIC MACHINE.

SPECIFICATION forming part of Letters Patent No. 664,396, dated December 25, 1900.

Application filed April 3, 1899. Serial No. 711,541. (No model.)

*To all whom it may concern:*

Be it known that I, ISRAEL FISHER, of Boston, county of Suffolk, and State of Massachusetts, have invented an Improvement in Dynamo-Electric Machines, of which the following description, in connection with the accompanying drawings, is a specification, like letters on the drawings representing like parts.

This invention relates to a dynamo-electric machine adapted to be used with straight currents and is shown as embodied in a motor, the object of the invention being to obtain a small and powerful motor of light weight which can be used to advantage with a comparatively small battery.

The motor embodying the invention has a multipolar field-magnet in which the pole-pieces are close together and alternately wound in opposite directions, so as to produce alternately north and south poles when the current is passed through the coils. The armature is correspondingly provided with pole-pieces equal in number to the field-poles, the said armature pole-pieces also being alternately wound in opposite directions, so that adjacent poles will always be opposite in sign. Each armature-coil is connected with a commutator-segment, so that as the armature rotates the direction of current through the armature-coils will be continually reversed, whereby the polarity in each pole-piece will keep shifting from north to south, and vice versa. In order that the direction of the current flowing around each pair of polar extremities of the armature may be shifted each time the brush crosses from one commutator-segment to the next, alternate segments are connected with each other throughout, so that the current coming in through the positive brush is distributed through half the coils, passing through said coils in one direction and out through the other coils in the other direction and finally through the segment which the negative brush is resting on at the time.

The commutator is so arranged that the direction of the current will change just as the polar extremities of the armature are passing the polar extremities of the field-magnet, the armature-pole which is opposite a north pole of the field-magnet then becoming north, so as to be repelled by the said pole and attracted by the next, thus causing the rotation of the armature. By this construction the circumference of the armature may be relatively large, and the pull exerted thereon, consisting of a number of forces, each extending from one pole-piece of the field to the next, is such that each force works in a line substantially tangential to the armature, so that the combined forces operate to the best advantage in producing the rotation of the same.

The armature pole-pieces are preferably wound in pairs, the connections passing from one commutator-segment around one of said coils and then across and around the next one in the opposite direction and thence to the adjacent commutator-segment, so that each pair of coils practically constitutes a horseshoe-magnet with a complete magnetic circuit. By connecting all the commutator-segments as described the result is substantially the same as if there were only two coils, with the positive and negative brushes resting on adjacent segments, the said pairs of coils, however, being distributed around the armature, so that they all do their work simultaneously. With this construction, however, it is obvious that if the armature comes to rest with its polar extremities exactly opposite the polar extremities of the field the forces of attraction and repulsion will pass in radial lines from the polar extremities of one member to those of the other, so that no torque will be produced until the armature is started or moved away from the "dead-point," as it may be called. In certain cases—for example, in small motors, which may be easily started by hand—this is no detriment; but in other cases it is desirable that the motor should be self-starting. For this purpose a further part of the invention consists in providing the motor with a double armature, each armature part having a separate commutator, the two armatures or armature parts being mounted on a common shaft and adapted to coöperate with the same field-magnets. The two armature parts are alike, each having the same number of polar extremities as the field, one set of said polar extremities, however, being situated slightly in advance of the other, so that one set of poles will always be out of line with the poles of the field, whereby it is impossible for the armature to come to rest at a dead-point such as above described. The current may be equally divided between the two armature parts, as by connecting the two sets of brushes in multiple, so that in the operation of the motor the effect is substantially the same as with a single armature, there being no loss of power by dividing the coils in this way.

Figure 1 is an end elevation of a motor embodying the invention; Fig. 2, a diagram view of the same, showing the electrical connections; Fig. 3, a detail, partly broken away, to show a side elevation of a double armature; and Fig. 4 a detail in diagram showing a modification in the armature-winding.

Since the double armature above described is thus arranged merely for the purpose of making the motor self-starting without in any way altering the general arrangement or operation of the motor, Figs. 1 and 2 of the drawings are shown with but a single armature in order to avoid confusion and to render the construction more easily understood.

The field-magnet portion of the motor is shown as a ring $a$, having a number of polar projections $a^2$, upon which the conductor is wound in series, so that the current passes around adjacent pole-pieces in opposite directions, whereby the poles alternate north and south around the field. The field-coils are energized by a direct current, so that the alternating north and south poles remain unchanged while the motor is in operation.

The armature $b$ is similarly provided with polar extremities $b^2$, corresponding in number to the polar extremities $a^2$, the said polar extremities $b^2$ being wound alternately in opposite directions, as best shown in Fig. 2. The armature is further provided with a commutator $c$, and each coil is connected at one end with one of the commutator-segments, which are equal in number to the number of coils. The opposite end of each coil is electrically connected with the next adjacent segment, the coils, however, being preferably arranged in pairs, as shown in Fig. 2, each pair being in series, so that the current will pass from one commutator-segment through one coil, thence across to the next coil in the opposite direction, and thence to the next commutator-segment. By this means each pair of coils and the pole-pieces upon which they are wound practically constitute a horseshoe-electromagnet, one end of which is north and the other south, so that the magnetic circuit is complete and no consequent pole is formed in the armature-core, as would be the case if the coils were separately connected in alternate segments. The coils, however, may obviously be thus separately connected, if desired, as shown in Fig. 4. It will be seen that the commutator thus has two sets of segments $c^2$ and $c^3$, all of the segments $c^2$ being connected with the coils which pass in one direction and all of the segments $c^3$ being connected with coils which are wound in the opposite direction. Taking, therefore, any one set of coils, it is obvious that if one brush is in contact with a segment $c^3$ and the other brush with the next adjacent segment the current coming in through one brush will pass through one pair of coils, so that one pole becomes north and the other south. Assuming, therefore, that the pole-pieces of the magnet are not in direct line with the pole-pieces of the field and that the north and south poles of the armature-coil are respectively near the north and south poles of a pair of field-coils, the armature north pole will be repelled by the field north pole and attracted by the field south pole and will tend to move away from the one and toward the other, thus setting up rotation in the armature. In order that this effect may be produced throughout the whole armature, the segments $c^2$ of the commutator are all connected with each other by means of conductors $c^{20}$ and the segments $c^3$ are all connected together by means of conductors $c^{30}$. As shown in Fig. 1, the conductor $c^{30}$ may be soldered or otherwise connected with projections $c^{31}$, through which the coils are connected with the segments, said conductor being out of contact with the projections $c^{21}$. The conductor $c^{20}$ is connected with the segments at their inner ends and is not shown in Fig. 1, being behind the commutator. The brushes $d\ d^2$, as shown, may be conveniently arranged nearly opposite each other, it being obviously immaterial, however, where they are placed, so long as they always rest, respectively, one on a segment $c^2$ and the other on a segment $c^3$.

As the armature rotates it is obvious that the segments move past the brushes, which come in contact with the segments $c^2$ and $c^3$ alternately, so that the polarity in the armature-coils is continually being reversed, whereby the forces of attraction and repulsion exerted between the armature and the field will operate continuously to produce the rotation of the armature.

As shown in Fig. 3, the armature is made in two parts, there being two sets of pole-pieces $b^2$ and $B^2$, each pair of pole-pieces corresponding to one of the pole-pieces of the field. The pole-pieces of one set are, as shown, set slightly in advance of or out of line with those of the other set, so that the two pole-pieces of a pair can never be directly opposite to the field pole-pieces at the same time. The brushes are so arranged that the direction of current is changed substantially as the pole-pieces of the armature cross the pole-pieces of the field, and it is obvious, therefore, that if the polar extremities $b^2$, for example, are exactly opposite the corresponding field-poles, so that the forces are neutralized, the poles $B^2$ will be out of line with the field pole-pieces, so that the forces of attraction and repulsion will operate to start the armature or keep the same in motion as the other pole-pieces are crossing the dead-point. The armature-current is preferably divided equally between the sets of coils, which may be arranged in multiple, as indicated in Fig. 3, so that except when the current is being commuted in one set of coils both sets are practically operating together with the same effect as would be produced if but a single armature were used, as shown in Figs. 1 and 2.

I claim—

1. A dynamo-electric machine having multipolar field-magnets, the adjacent poles of which alternate in sign; an armature having corresponding poles arranged in pairs, the poles of each pair being provided respectively with oppositely-wound coils, said coils being connected together in series; and a commutator having a segment for each armature-coil, the alternate commutator-segments being electrically connected with each other, and adjacent segments being connected respectively with the opposite ends of the series windings on the armature-poles, as set forth.

2. In a dynamo-electric machine, the combination with a multipolar field-magnet in which adjacent poles alternate in sign; of an armature having corresponding poles arranged in pairs, one member of each pair having a coil in series with an oppositely-wound coil on the other member; a commutator having a segment for each coil connected to one end thereof, the segments for each pair of coils being adjacent to each other; and conductors connecting each segment with the next but one thereto, as set forth.

3. In a dynamo-electric machine, the combination with a multipolar field-magnet in which adjacent poles alternate; an armature having two pole-pieces for each field pole-piece, said armature pole-pieces being slightly out of line with each other; coils for the adjacent pole-pieces of each set, adjacent coils being wound in opposite directions; a commutator for each set having adjacent segments connected respectively with said coils, the segments connected with each set of coils being also connected with each other; and brushes so arranged that the segments shift the current through the same at the time when the pole-pieces are substantially in line with the field pole-pieces, as set forth.

In testimony whereof I have signed my name to this specification in the presence of two subscribing witnesses.

ISRAEL FISHER.

Witnesses:
 HENRY J. LIVERMORE,
 LAURA M. CHITTENDEN.